(12) United States Patent
Wakizaka

(10) Patent No.: US 10,059,518 B2
(45) Date of Patent: Aug. 28, 2018

(54) LIFT CARRIER DEVICE

(71) Applicant: MURATA MACHINERY, LTD., Kyoto-shi, Kyoto (JP)

(72) Inventor: Michinobu Wakizaka, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 220 days.

(21) Appl. No.: 15/052,989

(22) Filed: Feb. 25, 2016

(65) Prior Publication Data
US 2016/0264356 A1    Sep. 15, 2016

(30) Foreign Application Priority Data

Mar. 10, 2015  (JP) .................................. 2015-047125

(51) Int. Cl.
*B65G 1/06* (2006.01)

(52) U.S. Cl.
CPC ..................... *B65G 1/06* (2013.01)

(58) Field of Classification Search
CPC ................... B65G 1/06; B65G 1/12
See application file for complete search history.

(56) References Cited

U.S. PATENT DOCUMENTS

| | | | | |
|---|---|---|---|---|
| 1,896,776 A * | 2/1933 | James | ...................... | B66B 5/286 187/249 |
| 5,203,464 A * | 4/1993 | Allen | ...................... | B65G 1/06 211/151 |
| 6,309,116 B1 * | 10/2001 | Mahara | ............... | G03F 7/70991 396/611 |
| 7,316,294 B2 * | 1/2008 | Mustalahti | ................ | B66B 1/42 187/249 |
| 7,349,067 B2 * | 3/2008 | Kuit | ...................... | G03F 7/7075 355/53 |
| 8,118,138 B2 * | 2/2012 | Aulanko | ............... | B66B 11/007 187/254 |
| 8,206,076 B2 * | 6/2012 | Ueda | ................. | H01L 21/67769 414/217 |
| 8,231,381 B2 * | 7/2012 | Hishiya | ............. | H01L 21/67109 414/938 |
| 8,307,952 B2 * | 11/2012 | Fargo | ........................ | B66B 9/00 187/251 |
| 2008/0060884 A1 * | 3/2008 | Reuter | ...................... | B66B 7/06 187/412 |
| 2015/0291390 A1 * | 10/2015 | Kakio | ................... | B66B 5/0031 187/249 |
| 2015/0314990 A1 * | 11/2015 | Sen | ........................ | B66B 11/022 187/254 |
| 2016/0289001 A1 * | 10/2016 | Shibata | ............. | H01L 21/67769 |

FOREIGN PATENT DOCUMENTS

| | | |
|---|---|---|
| JP | 2012-146748 A | 8/2012 |
| JP | 2012-188225 A | 10/2012 |

* cited by examiner

*Primary Examiner* — Michael A Riegelman
(74) *Attorney, Agent, or Firm* — Keating & Bennett, LLP

(57) ABSTRACT

In a lift carrier device, a controller causes a first longitudinal drive device and a second longitudinal drive device respectively to be lifted or lowered by a first lift drive device and a second lift drive device, to cause a first article stage and a second article stage to pass by each other in a state where the first article stage and the second article stage have been moved by the first longitudinal drive device and the second longitudinal drive device to positions where the first article stage and the second article stage do not longitudinally overlap each other in plan view.

4 Claims, 16 Drawing Sheets

LIFT CARRIER DEVICE

BACKGROUND OF THE INVENTION

1. Field of the Invention

The present invention relates to a lift carrier device, and particularly relates to a lift carrier device that carries an article into or out of an automated warehouse that includes a plurality of levels of shelves.

2. Description of the Related Art

There is known an automated warehouse provided with a plurality of carriers corresponding to respective levels of a rack. Each carrier transfers an article to and from each level of the shelf while traveling in a direction of the rack on each level. In such an automated warehouse, a lift carrier device is provided for carrying the article to or from each level of the rack.

Japanese Unexamined Patent Publication No. 2012-188225 discloses a lift device including a lift stage that is raised and lowered along a mast.

The above lift device can lift or lower and carry only one article at a time. That is, the lift device does not have sufficient carrying capacity. Hence the lift device cannot carry a large amount of articles into and out of the automated warehouse in a short period of time.

SUMMARY OF THE INVENTION

Preferred embodiments of the present invention improve an article carrying capacity in a lift carrier device.

Hereinafter, a description will be given of a plurality of aspects of various preferred embodiments of the present invention. These aspects can be arbitrarily combined as needed.

A lift carrier device according to one aspect of various preferred embodiments of the present invention is a device that lifts or lowers and carries an article. The lift carrier device includes a first article stage, a first longitudinal drive device, a first lift drive device, a second article stage, a second longitudinal drive device, a second lift drive device, and a controller.

The first article stage includes a first conveyor capable of moving the article in a longitudinal direction.

The first longitudinal drive device supports and drives the first article stage in a longitudinally movable manner.

The first lift drive device supports and drives the first longitudinal drive device in a liftable manner.

The second article stage includes a second conveyor capable of moving the article in the longitudinal direction.

The second longitudinal drive device is provided in a position to sandwich the first article stage with the first longitudinal drive device in a lateral direction perpendicular or substantially perpendicular to the longitudinal direction, and supports and drives the second article stage in a longitudinally movable manner on a first longitudinal drive device side.

The second lift drive device supports and drives the second longitudinal drive device in a liftable manner.

The controller is configured or programmed to cause the first longitudinal drive device and the second longitudinal drive device to be relatively lifted or lowered by the first lift drive device and the second lift drive device, to cause the first article stage and the second article stage to pass by each other in a state where the first article stage and the second article stage have been moved by the first longitudinal drive device and the second longitudinal drive device to positions where the first article stage and the second article stage do not longitudinally overlap each other in plan view.

In this device, the first lift drive device lifts or lowers the first longitudinal drive device, the first longitudinal drive device longitudinally moves the first article stage, and the first conveyor of the first article stage longitudinally moves the article. Further, the second lift drive device lifts or lowers the second longitudinal drive device, the second longitudinal drive device longitudinally moves the second article stage, and the second conveyor of the second article stage longitudinally moves the article. With the above operation, the lift carrier device carries the article.

In this device, since the two article stages carry the articles, the carrying capacity of the lift carrier device is improved. In particular, since the first article stage and the second article stage are able to pass by each other by being relatively lifted or lowered in a state where the first article stage and the second article stage have been moved to positions where they do not longitudinally overlap each other in plan view, the flexibility to carry the article is increased. This leads to improvement in capacity of the lift carrier device to carry the article.

The first longitudinal drive device may include a first body. The first body includes a pair of first frames, each of which is arranged separately in a vertical direction and extends in the longitudinal direction, and a pair of second frames, each of which is arranged on each longitudinal side and extends in the vertical direction to couple end portions of the pair of first frames. The second longitudinal drive device may include a second body. The second body includes a pair of third frames, each of which is arranged separately in the vertical direction and extends in the longitudinal direction, and a pair of fourth frames, each of which is arranged on each longitudinal side and extends in the vertical direction to couple end portions of the pair of third frames.

In this device, the first body and the second body have frame shapes defined by the frames, thus increasing rigidity.

The lift carrier device may further include a pair of first struts, a pair of second struts, and a plurality of coupling members. Each of the pair of first struts is arranged separately in the longitudinal direction and liftably supports the first body. Each of the pair of second struts is arranged separately in the longitudinal direction and liftably supports each end portion of the second body. The plurality of coupling members extend in the lateral direction and couple the first strut and the second strut with each other which are located in longitudinally corresponding positions. The plurality of coupling members may be provided in positions where the coupling members do not inhibit storage and retrieval of the article in the longitudinal direction on the first article stage and the second article stage.

In this device, the first strut and the second strut, which are located in longitudinally corresponding positions, are coupled by the plurality of coupling members, thus increasing the rigidity of the lift carrier device. Further, the plurality of coupling members are provided in positions where the coupling members do not inhibit storage and retrieval of the article in the longitudinal direction on the first article stage and the second article stage, thus preventing deterioration in carrying capacity of the lift carrier device.

The first longitudinal drive device may include a first drive mechanism that moves the first article stage in the longitudinal direction.

The first drive mechanism may be arranged so as to be within a lateral width of the first body in plan view.

The second longitudinal drive device may include a second drive mechanism that moves the second article stage in the longitudinal direction.

The second drive mechanism may be arranged so as to be within a lateral width of the second body in plan view.

In this device, the first drive mechanism of the first longitudinal drive device moves the first article stage in the longitudinal direction. Further, the second drive mechanism of the second longitudinal drive device moves the second article stage in the longitudinal direction. The first drive mechanism is arranged so as to be within the lateral width of the first body in plan view, and further, the second drive mechanism is arranged so as to be within the lateral width of the second body in plan view, thus reducing a lateral size of the lift carrier device.

The first lift drive device may include a plurality of first direction conversion members, a first endless drive transmission member that is hung on the plurality of first direction conversion members and mounted with the first longitudinal drive device, and a first counter weight mounted on the first endless drive transmission member.

The second lift drive device may include a plurality of second direction conversion members, a second endless drive transmission member that is hung on the plurality of second direction conversion members and mounted with the second longitudinal drive device, and a second counter weight mounted on the second endless drive transmission member.

The first counter weight and the second counter weight may be arranged on the same lateral side with respect to the first article stage and the second article stage.

In this device, the first counter weight and the second counter weight are arranged on the same lateral side with respect to the first article stage and the second article stage. Thus, by arranging the first counter weight and the second counter weight of the adjacent lift carrier devices so as to come close to each other, a space with a desired width is ensured between the adjacent lift carrier devices.

Each of the first conveyor and the second conveyor may include a plurality of levels of conveyors that are arranged vertically alongside and move integrally.

In this device, each of the first conveyor and the second conveyor includes a plurality of levels of conveyors, thus improving the capacity to carry the article.

In a lift carrier device according to a preferred embodiment of the present invention, an article carrying capacity is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
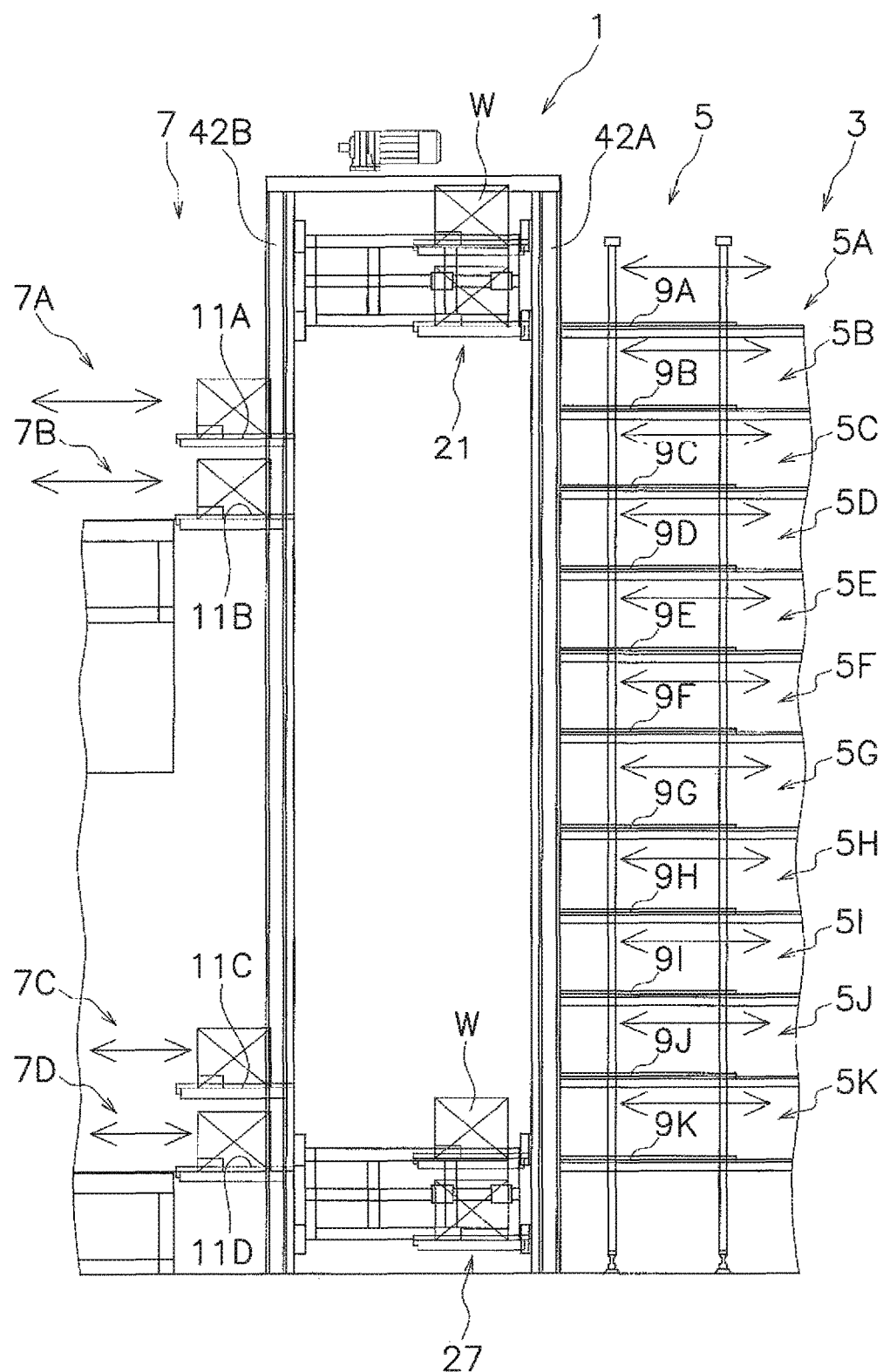
FIG. 1 is a front view of a lift carrier device.
Figure 2:
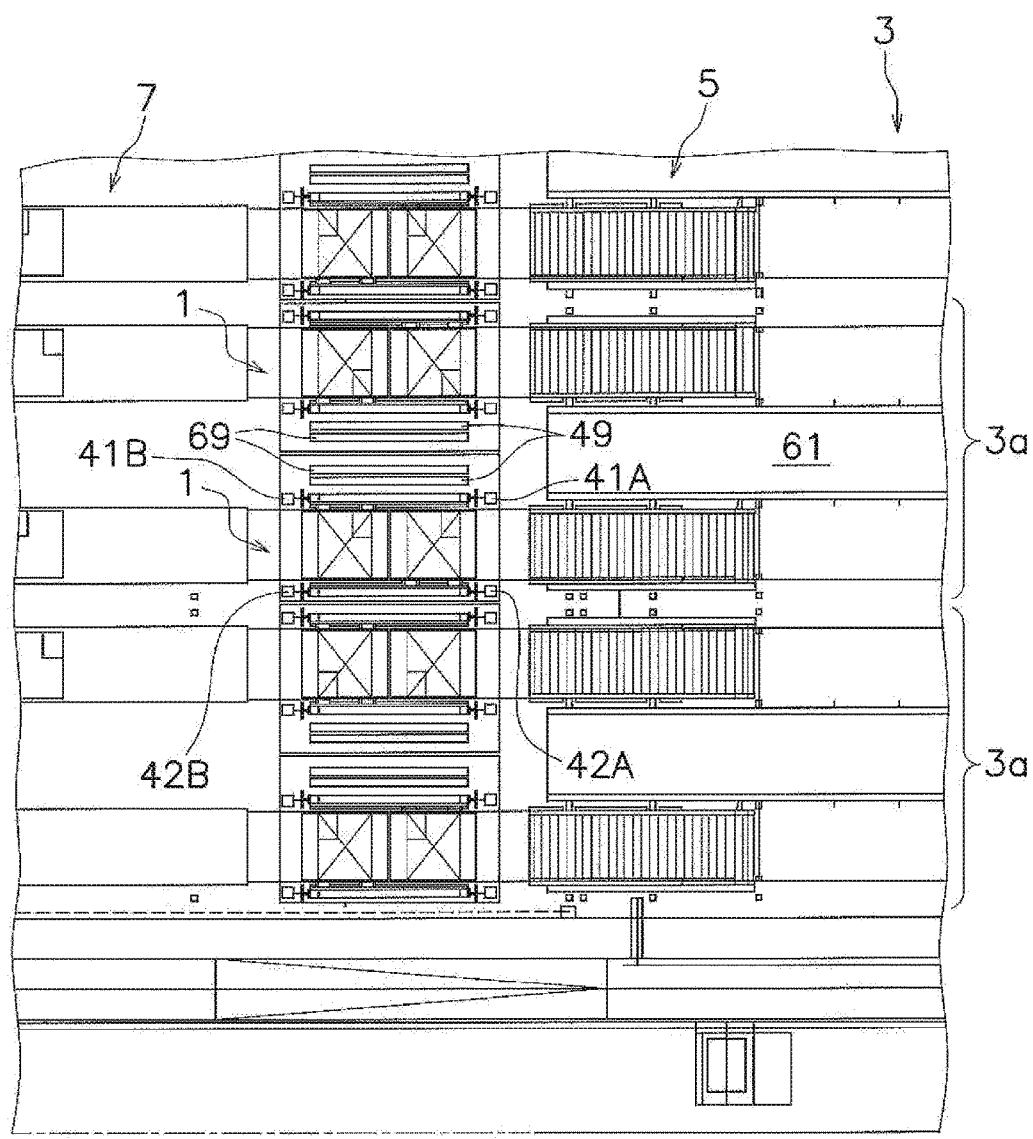
FIG. 2 is a plan view of a plurality of lift carrier devices.

With reference to FIGS. 1 and 2, a lift carrier device 1 of a first preferred embodiment of the present invention will be described. FIG. 1 is a schematic front view of the lift carrier device of the first preferred embodiment. FIG. 2 is a plan view of a plurality of lift carrier devices.

The lift carrier device 1 is a device that carries an article W into or out of an automated warehouse 3 that includes a plurality of levels of shelves. In the following description, a lateral direction of FIG. 1 is referred to as a longitudinal direction (a first horizontal direction), and a direction perpendicular or substantially perpendicular to the longitudinal direction is referred to as a lateral direction (a second horizontal direction).

As illustrated in FIG. 1, the lift carrier device 1 is arranged longitudinally between a storage and retrieval device 5 of the automated warehouse 3 and a storage and retrieval station 7, and carries the article W therebetween. The automated warehouse 3 is an automated warehouse of a shuttle type on each level, and a carrier (not illustrated) is reciprocatably arranged on each level of the rack. The storage and retrieval device 5 is a device that carries the article W into and out of the automated warehouse 3. The storage and retrieval device 5 includes a plurality of levels 5A to 5K. The levels 5A to 5K include conveyers 9A to 9K that carry the articles W in the longitudinal direction. On the right side of the conveyors 9A to 9K in FIG. 1, carriers (not illustrated) that travel on the respective levels of the automated warehouse 3 are arranged. The storage and retrieval station 7 includes a plurality of levels 7A to 7D. The levels 7A, 7B are located on the upper side of the storage and retrieval station 7, and the levels 7C and 7D are located on the lower side of the storage and retrieval station 7. The levels 7A to 7D respectively include conveyors 11A to 11D that carry the articles W in the longitudinal direction.

As described above, the storage and retrieval station 7 includes two levels of conveyors each on an upper level and a lower level. Hence, two-level simultaneous transfer of the articles W is possible on the upper level and the lower level. Since each of the upper level and the lower level includes two levels of conveyors, performance as a buffer is improved. However, as another preferred embodiment of the present invention, each of the upper level and the lower level may include one level of conveyor.

Figure 3:
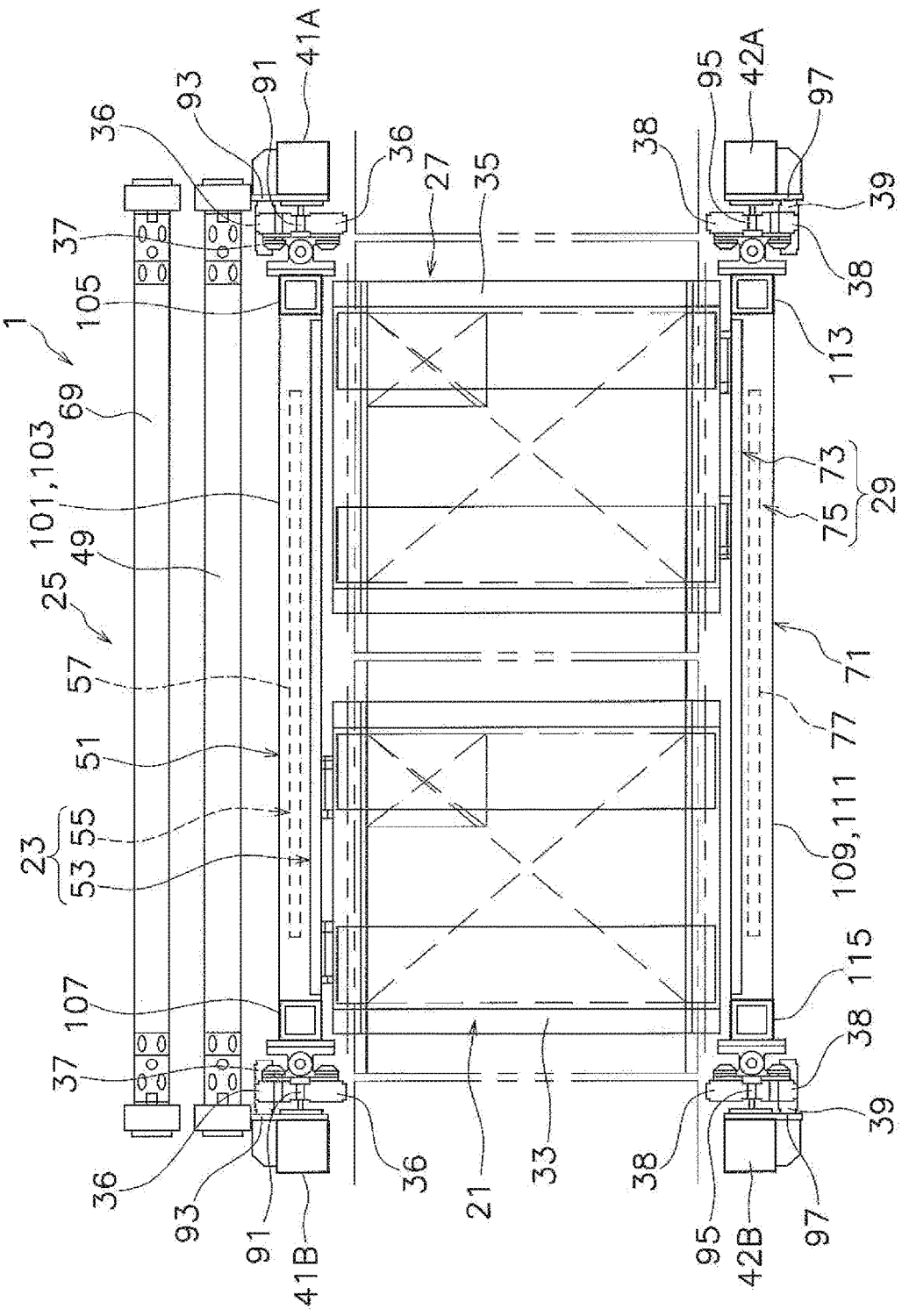
FIG. 3 is a plan view of the lift carrier device.
Figure 4:
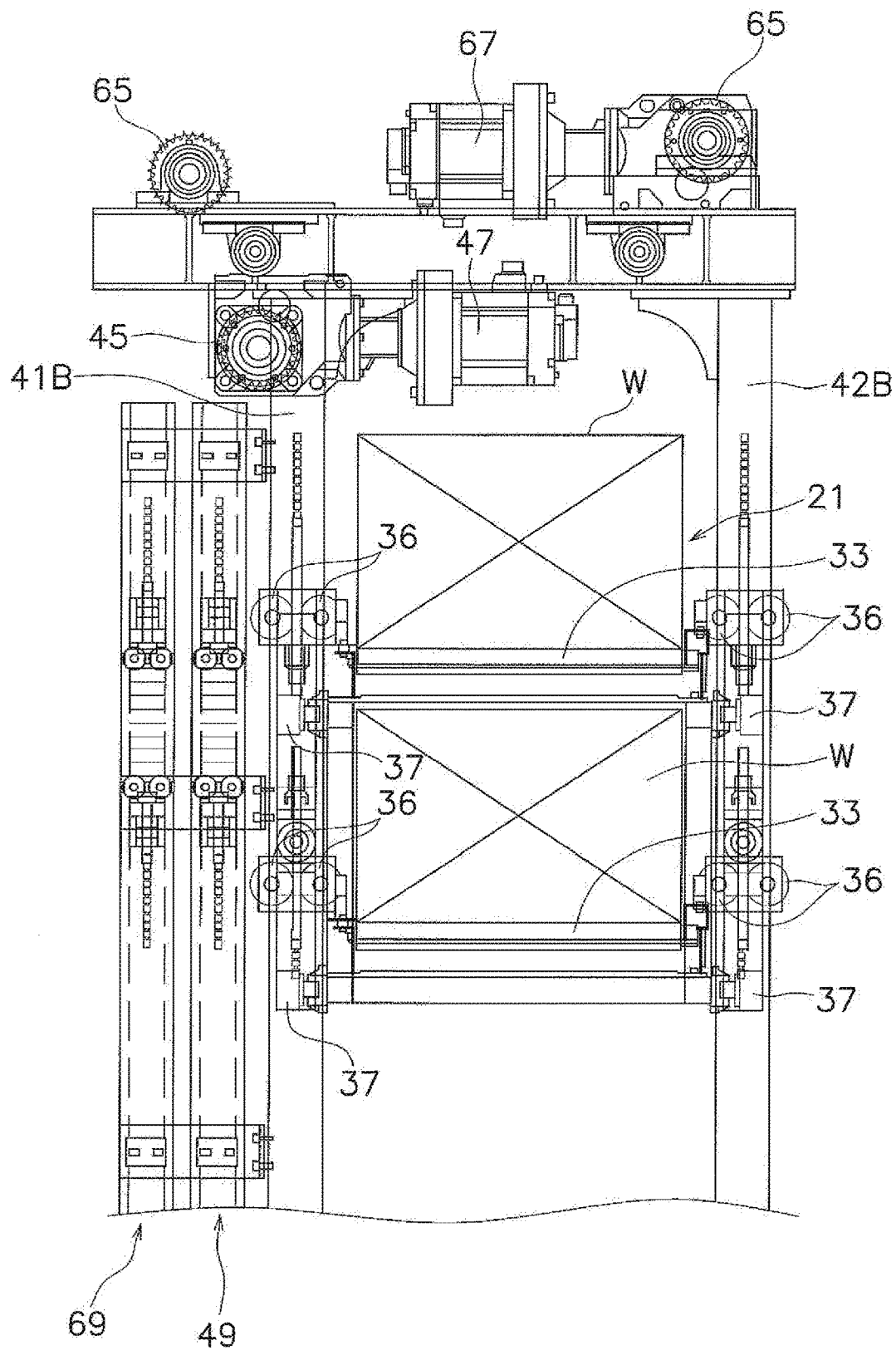
FIG. 4 is a partially enlarged side view of the lift carrier device.
Figure 5:
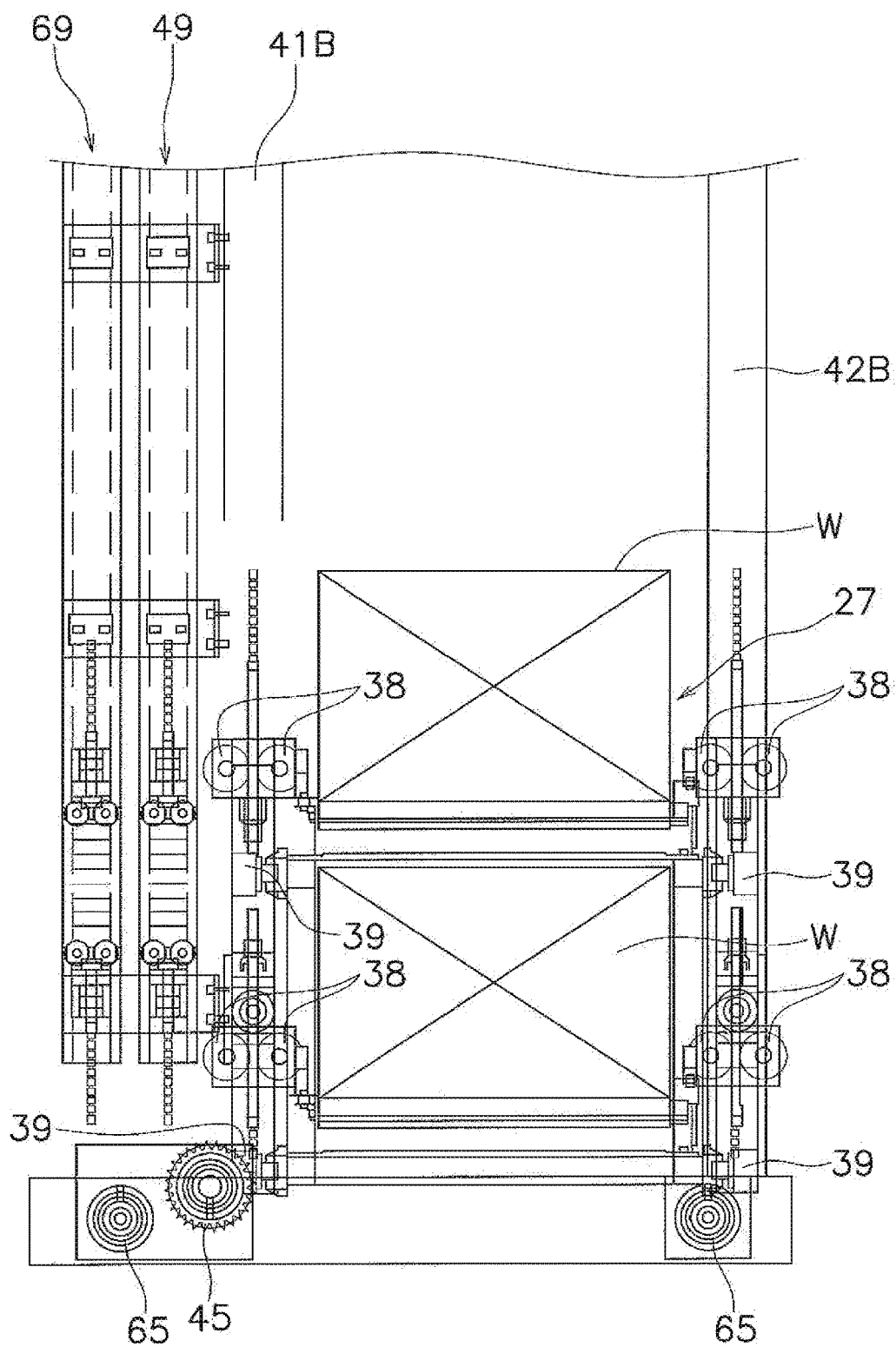
FIG. 5 is a partially enlarged side view of the lift carrier device.
Figure 6:
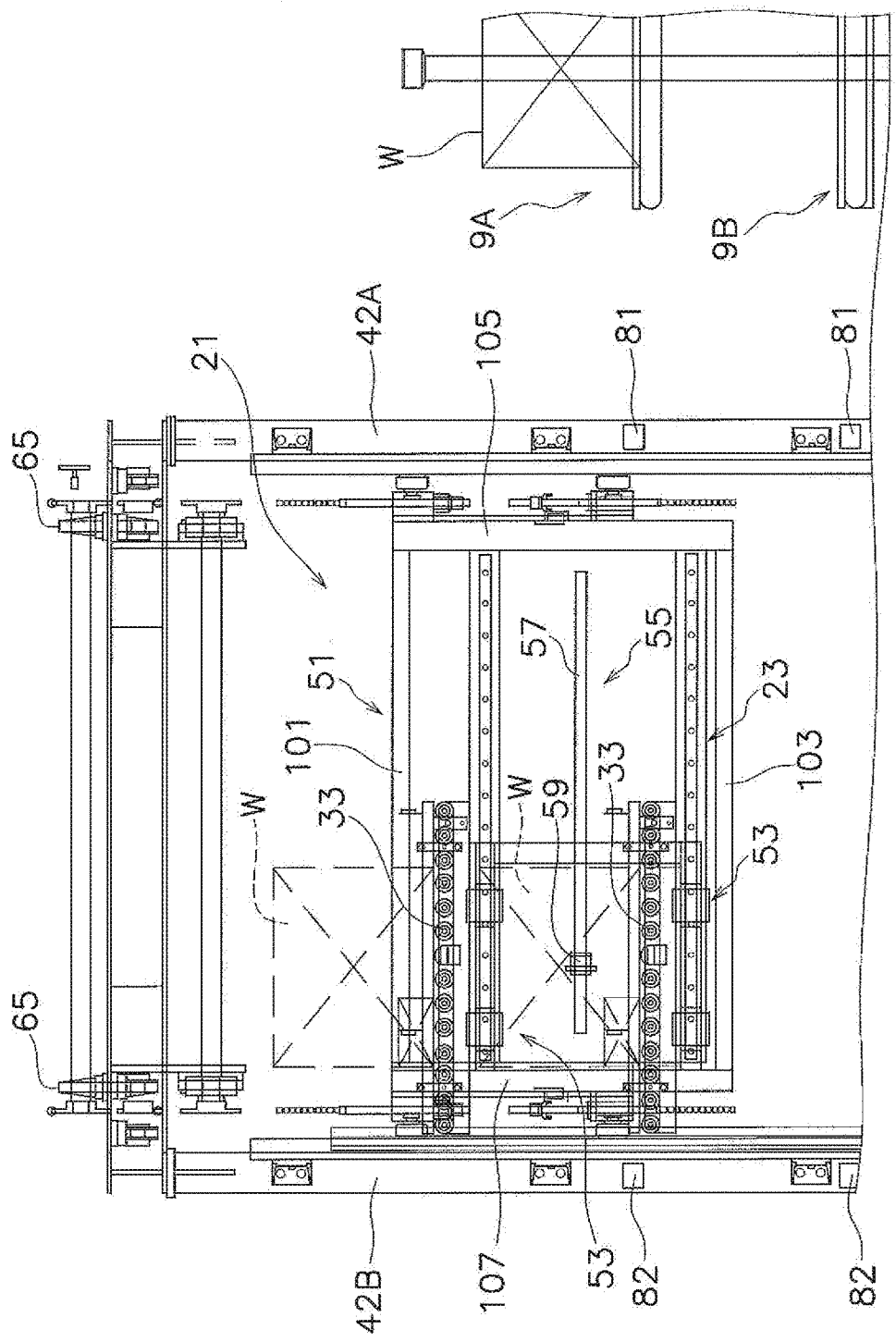
FIG. 6 is a partially enlarged front view of the lift carrier device.
Figure 7:
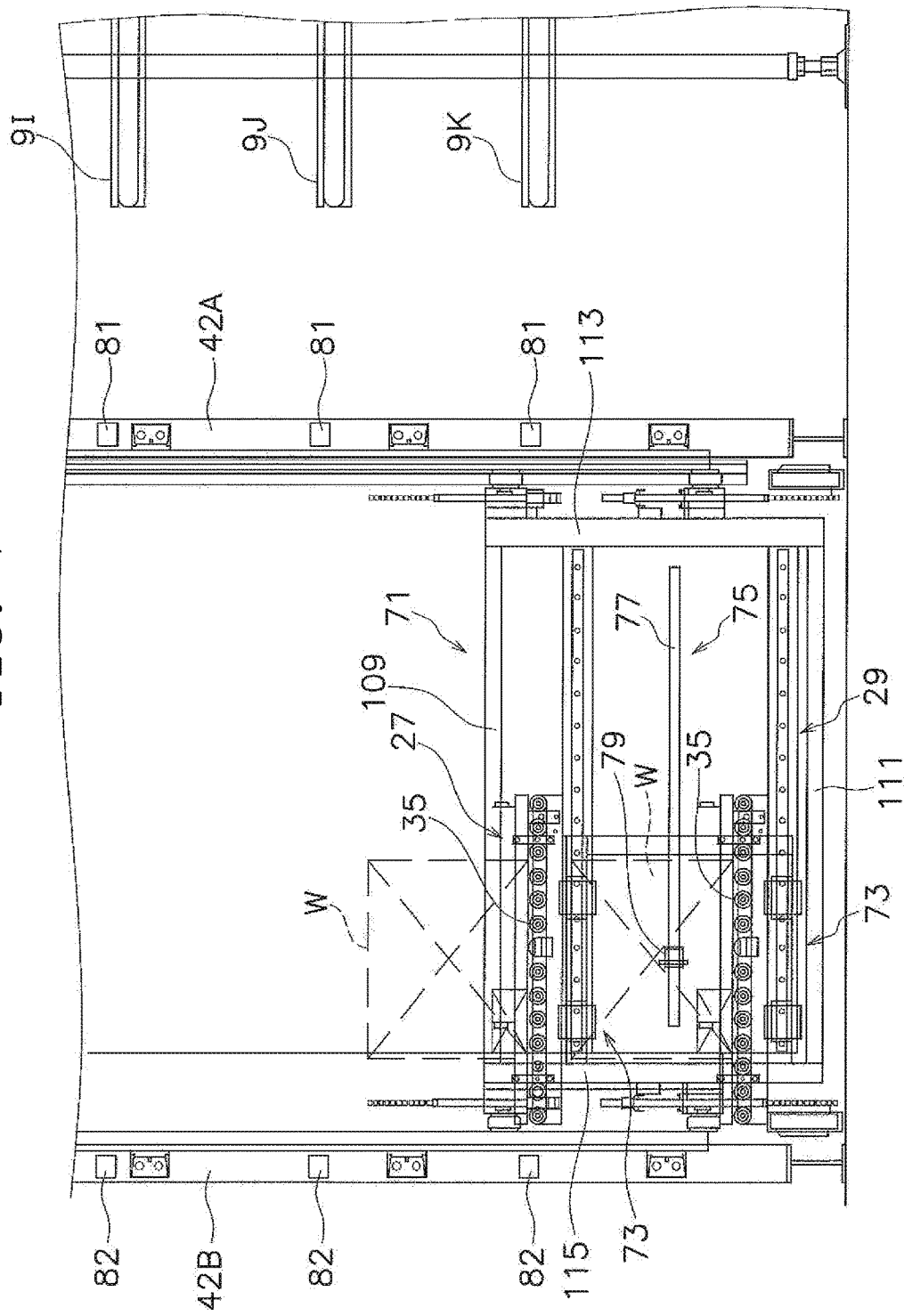
FIG. 7 is a partially enlarged front view of the lift carrier device.

With reference to FIGS. 3 to 7, a detailed configuration of the lift carrier device 1 will be described. FIG. 3 is a plan view of the lift carrier device. FIGS. 4 and 5 are partially enlarged side views of the lift carrier device. FIGS. 6 and 7 are partially enlarged views of the lift carrier device.

The lift carrier device 1 is a device that lifts or lowers and carries the article W. The lift carrier device 1 lifts or lowers a first article stage 21 and a second article stage 27 (described later) by use of a first endless drive transmission member 43 and a second endless drive transmission member 63 (described later) which circulate. The first article stage 21 and the second article stage 27 are movable in the longitudinal direction within the same region in plan view. Then, when the first article stage 21 and the second article stage 27 have moved to different positions in plan view, the first article stage 21 and the second article stage 27 are able to pass by each other in a vertical direction.

The lift carrier device 1 includes a pair of first struts 41A, 41B and a pair of second struts 42A, 42B. The four struts 41A, 41B, 42A, 42B are arranged at vertex positions of a rectangle in plan view. The pair of first struts 41A, 41B are spaced apart from each other in the longitudinal direction. The pair of second struts 42A, 42B are spaced apart from the pair of first struts 41A, 41B in the lateral direction, and are further spaced apart from each other in the longitudinal direction.

Figure 9:
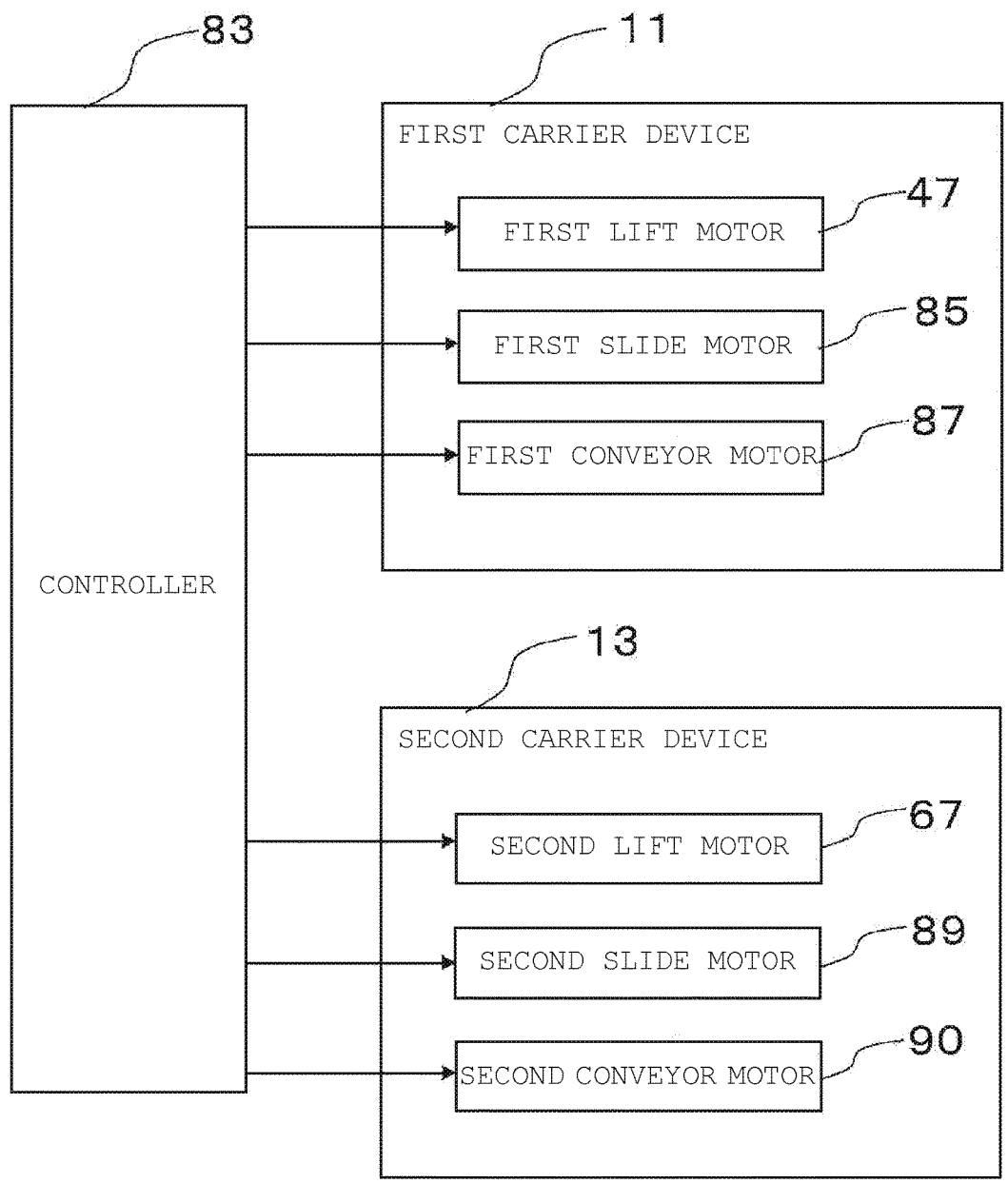
FIG. 9 is a block diagram illustrating a controlling configuration of the lift carrier device.

The lift carrier device 1 includes a first carrier device 11 (FIG. 9) and a second carrier device 13 (FIG. 9). The first carrier device 11 includes a first lift drive device 25, the first article stage 21, and a first longitudinal drive device 23. The second carrier device 13 includes a second lift drive device 31, the second article stage 27, and a second longitudinal drive device 29.

The first longitudinal drive device 23 supports and drives the first article stage 21 in a longitudinally movable manner with respect to the first lift drive device 25.

The first longitudinal drive device 23 includes a first body 51. The first body 51 is coupled to the first endless drive transmission member 43 (described later).

The first body 51 includes a plurality of frames, and is liftably supported by the pair of first struts 41A, 41B. Since the first body 51 is lifted or lowered by being supported by the pair of first struts 41A, 41B as described above, a posture of the first body 51 is stable, and hence a posture of the first article stage 21 (described later) is correctly maintained.

Specifically, as illustrated in FIG. 6, the first body 51 includes a pair of first frames 101, 103 and a pair of second frames 105, 107. Each of the pair of first frames 101, 103 is vertically separately arranged, and extends in the longitudinal direction. Each of the pair of second frames 105, 107 is arranged on each longitudinal side, and extends in the vertical direction to couple end portions of the pair of first frames 101, 103. The first body 51 has a frame shape defined by the frames, thus increasing rigidity. Further, reduction in weight of the first body 51 is also realized.

As illustrated in FIG. 3, each of the pair of first frames 101, 103 has a short width in the lateral direction in plan view, and the lateral width of each of the pair of first frames 101, 103 is shorter than the lateral width of each of the first struts 41A, 41B. Further, each of the pair of first frames 101, 103 is arranged substantially corresponding to a region of the lateral width of each of the first struts 41A, 41B.

On each longitudinal end of the first body 51, a pair of first guide rollers 36 is provided. A rotating axis of each of the pair of first guide rollers 36 is directed in the longitudinal direction. As illustrated in FIG. 3, a vertically extending first plate 91 is fixed to each of the pair of first struts 41A, 41B. The pair of first guide rollers 36 abuts on both surfaces of the first plate 91.

On each longitudinal end of the first body 51, a second guide roller 37 is provided. A rotating axis of the second guide roller 37 is directed in the lateral direction. As illustrated in FIG. 3, a vertically extending second plate 93 is fixed to each of the pair of first struts 41A, 41B. The second guide roller 37 abuts on one surface of the second plate 93. Note that the pair of first guide rollers 36 and the second guide roller 37 are provided in each of two locations in the vertical direction on each longitudinal side.

The first longitudinal drive device 23 includes a first linear guide mechanism 53. The first linear guide mechanism 53 is a member that supports the first article stage 21 in a longitudinally movable manner with respect to the first body 51 of the first lift drive device 25. The first linear guide mechanism 53 is, for example, a linear guide.

The first longitudinal drive device 23 includes a first linear drive mechanism 55. The first linear drive mechanism 55 is a mechanism that applies force to the first article stage 21 in the longitudinal direction. The first linear drive mechanism 55 preferably includes a ball screw 57 and a nut 59. The ball screw 57 is fixed to the first body 51 of the first lift drive device 25, and extends in the longitudinal direction. The nut 59 is fixed to the first article stage 21. The first longitudinal drive device 23 includes a first slide motor 85 (FIG. 9). When the first slide motor 85 rotates the ball screw 57, the first article stage 21 moves in the longitudinal direction along with the nut 59.

As illustrated in FIG. 3, the first linear drive mechanism 55 is arranged so as to be within the first body 51, that is, within the lateral width of each of the pair of first frames 101, 103, in plan view. Hence a lateral size of the lift carrier device 1 is short. Herein, being "arranged so as to be within the lateral width" means that the first linear drive mechanism 55 does not protrude in the lateral direction with respect to the first body 51, that is, the pair of first frames 101, 103, in plan view.

However, as another preferred embodiment, the first linear drive mechanism 55 may be arranged so that the first linear drive mechanism 55 entirely or partly protrudes from the lateral width of the first body 51 in plan view.

The first lift drive device 25 is a device that supports and drives the first longitudinal drive device 23 in a liftable manner.

The first lift drive device 25 includes the first endless drive transmission member 43. The first endless drive transmission member 43 is a chain. The first endless drive transmission member 43 is a member that lifts or lowers the first body 51. The first endless drive transmission member 43 is arranged so as to be able to circulate within a vertical plane parallel or substantially parallel to the lateral direction.

The first lift drive device 25 includes a first lift motor 47 that rotationally drives the first endless drive transmission member 43. The first lift motor 47 is provided above the first strut 41A, the first strut 41B, the second strut 42A, and the second strut 42B.

The first lift drive device 25 includes a plurality of first-direction conversion members 45. The first-direction conversion member 45 is a sprocket. The first endless drive transmission member 43 is hung on the plurality of first-direction conversion members 45. By driving one of the first-direction conversion members 45 by the first lift motor 47, the first endless drive transmission member 43 circulates. When a rotating direction of the first lift motor 47 is switched, a circulating direction of the first endless drive transmission member 43 is switched.

The first lift drive device 25 includes a first counter weight 49. The first counter weight 49 is fixed to the first endless drive transmission member 43. The first counterweight 49 is a member having a predetermined weight. The first counter weight 49 is arranged on one lateral side with respect to the first body 51 in plan view.

The first article stage 21 includes a first conveyor 33 capable of moving the article W in the longitudinal direction. The first article stage 21 is cantilever-supported on one lateral side with respect to the first body 51. The first article stage 21 is arranged laterally close to a second body 71 (described later) in plan view, as illustrated in FIG. 3.

Further, a longitudinal length of the first article stage 21 is about half of the longitudinal length of the first body 51. Hence, the first article stage 21 is movable between a first position and a second position on both longitudinal sides in plan view with respect to the first body 51. The first conveyor 33 is driven by a first conveyor motor 87 (FIG. 9).

In this preferred embodiment, the first conveyor 33 is a two-level conveyor in which two levels of conveyors are arranged vertically alongside. This two-level first conveyor 33 is integrally movable. This leads to improvement in capacity of the lift carrier device 1 to carry the article W.

The second longitudinal drive device 29 is provided in a position to sandwich the first article stage 21 with the first longitudinal drive device 23 in the lateral direction. A lateral space between the first longitudinal drive device 23 and the second longitudinal drive device 29 is slightly longer than a lateral length of each of the first article stage 21 and the second article stage (described later). The second longitudinal drive device 29 supports and drives the second article stage 27 in a longitudinally movable manner in the second longitudinal drive device 29.

The second longitudinal drive device 29 includes a second body 71. The second body 71 is coupled to the second endless drive transmission member 63 (described later).

The second body 71 includes a plurality of frames, and is liftably supported by the pair of second struts 42A, 42B. Since the second body 71 is lifted or lowered by being supported by the pair of second struts 42A, 42B as described above, a posture of the second body 71 is stable, and hence a posture of the second article stage 27 is correctly maintained.

Specifically, as illustrated in FIG. 7, the second body 71 includes a pair of third frames 109, 111 and a pair of fourth frames 113, 115. Each of the pair of third frames 109, 111 is vertically separately arranged, and extends in the longitudinal direction. Each of the pair of fourth frames 113, 115 is arranged on each longitudinal side, and extends in the vertical direction to couple end portions of the pair of third frames 109, 111. The second body 71 has a frame shape defined by the frames, thus increasing rigidity. Further, reduction in weight of the second body 71 is also realized. As illustrated in FIG. 3, each of the pair of third frames 109, 111 has a short width in the lateral direction in plan view, and the lateral width of each of the pair of third frames 109, 111 is shorter than a lateral width of each of the second struts 42A, 42B. Further, the pair of third frames 109, 111 are arranged substantially corresponding to a region of the lateral width of each of the second struts 42A, 42B.

On each longitudinal end of the second body 71, a pair of third guide rollers 38 are provided. A rotating axis of each of the pair of third guide rollers 38 is directed in the longitudinal direction. As illustrated in FIG. 3, a vertically extending third plate 95 is fixed to each of the pair of second struts 42A, 42B. The pair of third guide rollers 38 abuts on both surfaces of the third plate 95.

On each longitudinal end of the second body 71, a fourth guide roller 39 is provided. A rotating axis of the fourth guide roller 39 is directed in the lateral direction. As illustrated in FIG. 3, a vertically extending fourth plate 97 is fixed to each of the pair of second struts 42A, 42B. The fourth guide roller 39 abuts on one surface of the fourth plate 97. Note that the pair of third guide rollers 38 and the fourth guide roller 39 are provided in two locations in the vertical direction on each longitudinal side.

The second longitudinal drive device 29 includes a second linear guide mechanism 73. The second linear guide mechanism 73 is a member that supports the second article stage 27 in a longitudinally movable manner with respect to the second body 71 of the second lift drive device 31. The second linear guide mechanism 73 is, for example, a linear guide.

The second longitudinal drive device 29 includes a second linear drive mechanism 75. The second linear drive mechanism 75 is a mechanism that applies force to the second article stage 27 in the longitudinal direction. The second linear drive mechanism 75 preferably includes a ball screw 77 and a nut 79. The ball screw 77 is fixed to the second body 71 of the second lift drive device 31, and extends in the longitudinal direction. The nut 79 is fixed to the second article stage 27. The second longitudinal drive device 29 includes a second slide motor 89 (FIG. 9). When the second slide motor 89 rotates the ball screw 77, the second article stage 27 moves in the longitudinal direction along with the nut 79.

As illustrated in FIG. 3, the second linear drive mechanism 75 is arranged so as to be within the lateral width of the second body 71 in plan view. Hence the lateral size of the lift carrier device 1 is short. Herein, being "arranged so as to be within the lateral width" means that the second linear drive mechanism 75 does not protrude in the lateral direction with respect to the second body 71 in plan view.

However, as another preferred embodiment, the second linear drive mechanism 75 may be arranged so that the second linear drive mechanism 75 entirely or partly protrudes from the lateral width of the second body 71 in plan view.

The second lift drive device 31 is a device that supports and drives the second longitudinal drive device 29 in a liftable manner.

The second lift drive device 31 includes the second endless drive transmission member 63. The second endless drive transmission member 63 is a member for lifts or lowers the second body 71. The second body 71 is coupled to the second endless drive transmission member 63. The second endless drive transmission member 63 is arranged so as to be able to circulate within a vertical plane parallel or substantially parallel to the lateral direction.

The second lift drive device 31 includes a second lift motor 67 that rotationally drives the second endless drive transmission member 63. The second lift motor 67 is provided above the first strut 41A, the first strut 41B, the second strut 42A, and the second strut 42B.

The second lift drive device 31 includes a plurality of second-direction conversion members 65. The second-direction conversion member 65 is a sprocket. The second endless drive transmission member 63 is hung on the second-direction conversion member 65. By driving one of the second-direction conversion members 65 by the second lift motor 67, the second endless drive transmission member 63 circulates. When a rotating direction of the second lift motor 67 is switched, a circulating direction of the second endless drive transmission member 63 is switched.

The second lift drive device 31 includes a second counter weight 69. The second counter weight 69 is fixed to the second endless drive transmission member 63. The second counter weight 69 is a member having a predetermined weight. The second counter weight 69 is arranged laterally on the opposite side to the first body 51 with respect to the first counter weight 49 in plan view.

Figure 8:
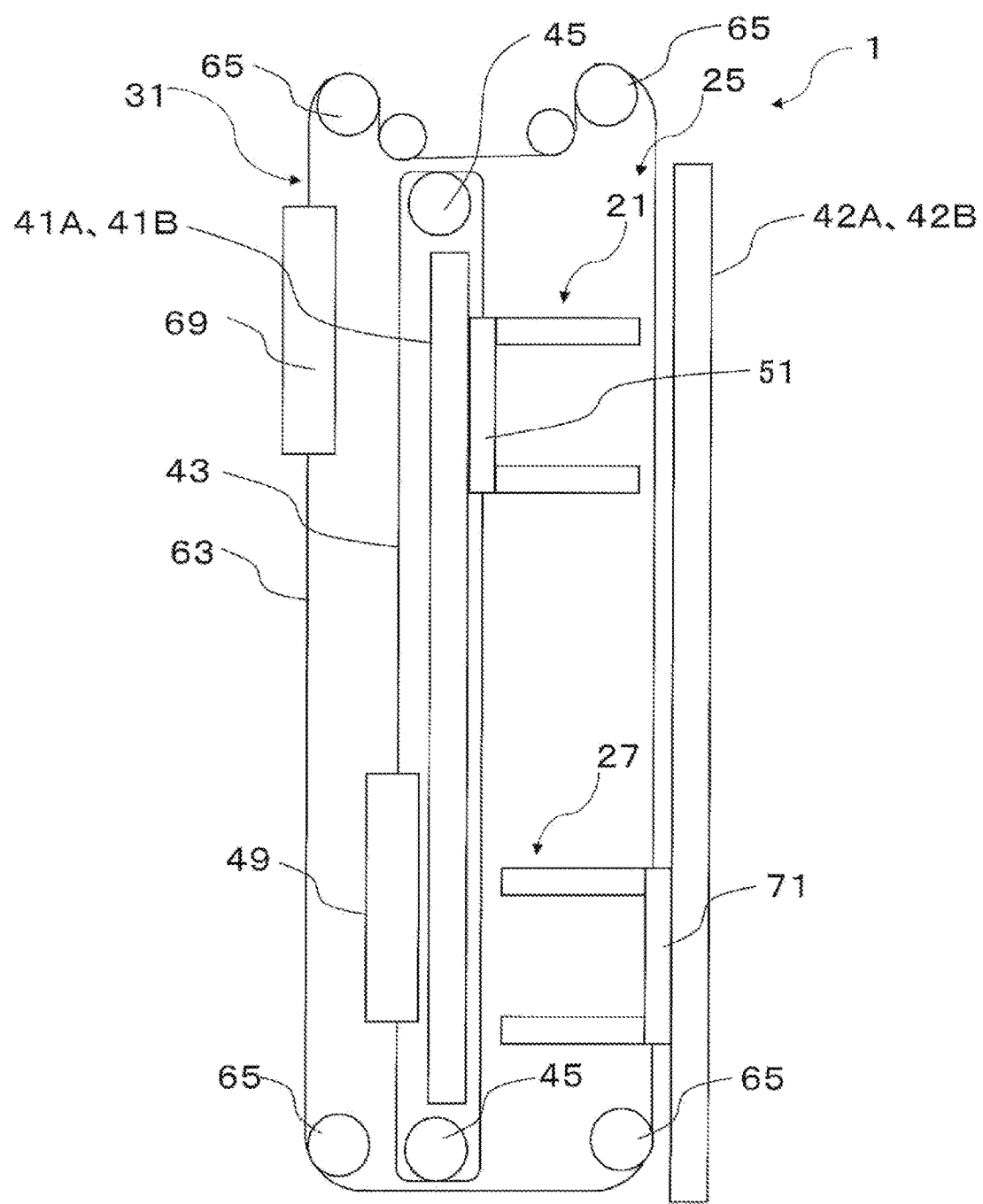
FIG. 8 is a schematic view illustrating a positional relationship of members of a lift drive device.

As illustrated in FIG. 8, the first counter weight 49 and the second counter weight 69 are arranged laterally on the same side with respect to the first article stage 21 and the second article stage 27. FIG. 8 is a schematic view for describing an arrangement relation of the members of the lift drive device.

As illustrated in FIG. 2, the automated warehouse 3 is divided into a plurality of automated warehouse units 3a. Each automated warehouse unit 3a includes a carrier path 61 along which a carrier (not illustrated, e.g., a stacker crane) travels, and a pair of conveyors and racks (not illustrated) on both sides of the carrier path 61.

An adjacent pair of lift carrier devices 1 is arranged laterally corresponding to the pair of racks of the automated warehouse unit 3a. The pair of lift carrier devices 1 are arranged such that the respective first counter weights 49 and second counter weights 69 are close to each other and correspond to the carrier path 61 of the automated warehouse unit 3a in the lateral direction. Note that a lateral width of the carrier path 61 corresponds to a lateral width of a region occupied by the first counter weight 49 and the second counter weight 69. Hence, a lateral size of the equipment is able to be made small.

The second article stage 27 includes a second conveyor 35 capable of moving the article W in the longitudinal direction. The second article stage 27 is cantilever-supported on one lateral side with respect to the second body 71. The second article stage 27 is arranged laterally close to the first body 51 in plan view.

Further, a longitudinal length of the second article stage 27 is about half of the longitudinal length of the second body 71. Hence, the second article stage 27 is movable between a first position and a second position on both longitudinal sides in plan view with respect to the second body 71. The second conveyor 35 is driven by a second conveyor motor 90 (FIG. 9).

In this preferred embodiment, the second conveyor 35 preferably is a two-level conveyor in which two levels of conveyors are arranged vertically alongside. The two-level second conveyor 35 is integrally movable. This leads to improvement in capacity to carry the article W.

As illustrated in FIGS. 6 and 7, the lift carrier device 1 includes a plurality of first coupling members 81. The plurality of first coupling members 81 are lateral lattice beams that extend long in the lateral direction and couple the first strut 41A and the second strut 42A with each other. The lift carrier device 1 includes a plurality of second coupling members 82. The plurality of second coupling members 82 are lateral lattice beams that extend long in the lateral direction and couple the first strut 41B and the second strut 42B with each other. The plurality of first coupling members 81 are provided in positions where the first coupling members 81 do not inhibit storage and retrieval of the article W in the longitudinal direction on the first article stage 21 and the second article stage 27. Specifically, the plurality of first coupling members 81 are provided so as to have the same or substantially the same height as the conveyors 9A to 9K in the vicinities of the conveyors 9A to 9K, and are not provided in height positions corresponding to a height region between the conveyors. The plurality of second coupling members 82 are provided in positions where the second coupling members 82 do not inhibit storage and retrieval of the article W in the longitudinal direction on the first article stage 21 and the second article stage 27. Specifically, the plurality of second coupling members 82 are provided so as have the same or substantially the same as height as the conveyors 11A to 11D in the vicinities of the conveyors 11A to 11D, and are not provided in height positions corresponding to a height region between the conveyors.

In the lift carrier device 1, the struts, which are located in longitudinally corresponding positions, are coupled with each other by the plurality of first coupling members 81 and second coupling members 82, thus increasing the rigidity of the lift carrier device 1. Further, the plurality of first coupling members 81 and second coupling members 82 are provided in positions where the plurality of first coupling members 81 and second coupling members 82 do not inhibit storage and retrieval of the article W in the longitudinal direction on the first article stage 21 and the second article stage 27, thus preventing deterioration in carrying capacity of the lift carrier device 1.

With reference to FIG. 9, a controlling configuration of the lift carrier device 1 will be described. FIG. 9 is a block diagram illustrating the controlling configuration of the lift carrier device.

The lift carrier device 1 includes a controller 83. The controller 83 is configured or programmed to control a variety of configurations of the lift carrier device 1. The controller 83 is a computer having a CPU, a RAM, and a ROM, and performs the above controlling operation by executing software.

The controller 83 is connected to the first lift motor 47, the first slide motor 85, and the first conveyor motor 87 of the first carrier device 11.

The controller 83 is connected to the second lift motor 67, the second slide motor 89, and the second conveyor motor 90 of the second carrier device 13.

The controller 83 controls operation of the above-described motors. Note that a plurality of sensors (not illustrated) that detect positions and states of each device are connected to the controller 83.

In the lift carrier device 1, the first lift drive device 25 lifts or lowers the first longitudinal drive device 23, the first longitudinal drive device 23 longitudinally moves the first article stage 21, and the first conveyor 33 of the first article stage 21 longitudinally moves the article. The longitudinal movement of the first article stage 21 may be performed simultaneously with the lifting or lowering of the first longitudinal drive device 23, or may be performed when the lifting or lowering of the first longitudinal drive device 23 is stopped. Further, the second lift drive device 31 lifts or lowers the second longitudinal drive device 29, the second longitudinal drive device 29 longitudinally moves the second article stage 27, and the second conveyor 35 of the second article stage 27 longitudinally moves the article W. The longitudinal movement of the second article stage 27 may be performed simultaneously with the lifting or lowering of the second longitudinal drive device 29, or may be performed when the lifting or lowering of the second longitudinal drive device 29 is stopped. With the above operation, the lift carrier device 1 carries the article W.

In the lift carrier device 1, since the two article stages carry the articles W, the carrying capacity of the lift carrier device 1 is improved. In particular, since the first article stage 21 and the second article stage 27 are able to pass by each other by being relatively lifted or lowered in a state where the first article stage 21 and the second article stage 27 have been moved to positions where they do not to longitudinally overlap each other in plan view, the flexibility to carry the article is increased. This leads to improvement in capacity of the lift carrier device 1 to carry the article W. Further, the first article stage 21 and the second article stage 27 are able to be arranged close to each other, to thus reduce the size of the lift carrier device 1.

In the lift carrier device 1, since the two article stages carry the articles W, even if one article stage is broken down, the carrying operation is able to be executed by the remaining other article stage. In particular, when the broken-down article stage waits on the storage and retrieval station 7 side between the conveyor 11B and the conveyor 11C, the remaining other article stage is able to access any of the conveyors.

The first body 51 of the first longitudinal drive device 23 and the second body 71 of the second longitudinal drive device 29 are arranged in laterally separate positions in plan view as described above. Between the first body 51 and the second body 71, the first position and the second position, where the first article stage 21 and the second article stage 27 are movable, are located. As illustrated in FIG. 3, when the first article stage 21 is in the first position and the second article stage 27 is in the second position, or when the first article stage 21 is in the second position and the second article stage 27 is in the first position, the two article stages do not overlap each other in plan view.

Figure 10:
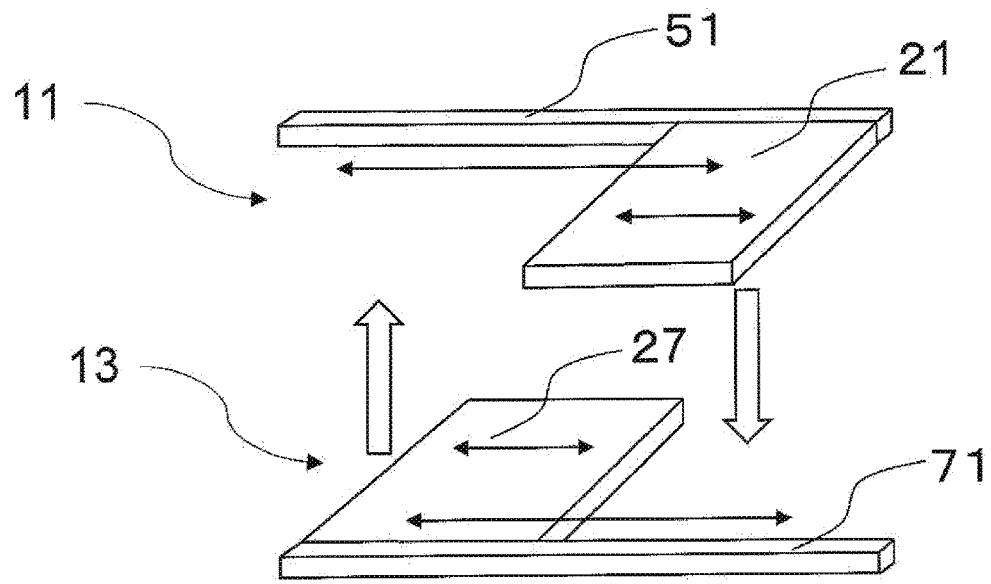
FIG. 10 is a schematic view illustrating a passing-by operation of lift stages.
Figure 11:
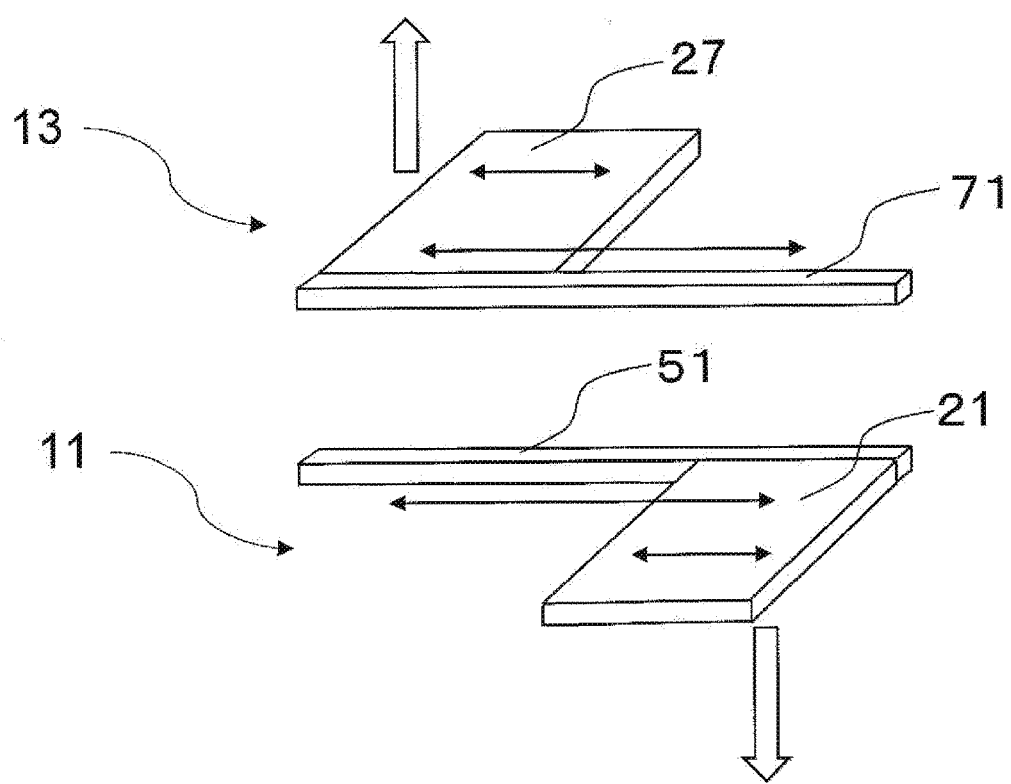
FIG. 11 is a schematic view illustrating a passing-by operation of the lift stages.

With reference to FIGS. 10 and 11, a vertical passing-by operation of the first article stage 21 and the second article stage 27 will be described. FIGS. 10 and 11 are schematic views for describing a passing-by operation of the lift stages.

The controller 83 causes the first longitudinal drive device 23 and the second longitudinal drive device 29 respectively to be lifted or lowered by the first lift drive device 25 and the second lift drive device 31, to cause the first article stage 21 and the second article stage 27 to pass by each other in a state where the first article stage 21 and the second article stage 27 have been moved by the first longitudinal drive device 23 and the second longitudinal drive device 29 to positions where the first article stage 21 and the second article stage 27 do not longitudinally overlap each other in plan view.

Note that the passing by is also realized in such a manner that one of the first article stage 21 and the second article stage 27 is stopped and the other is lifted or lowered.

Figure 12:
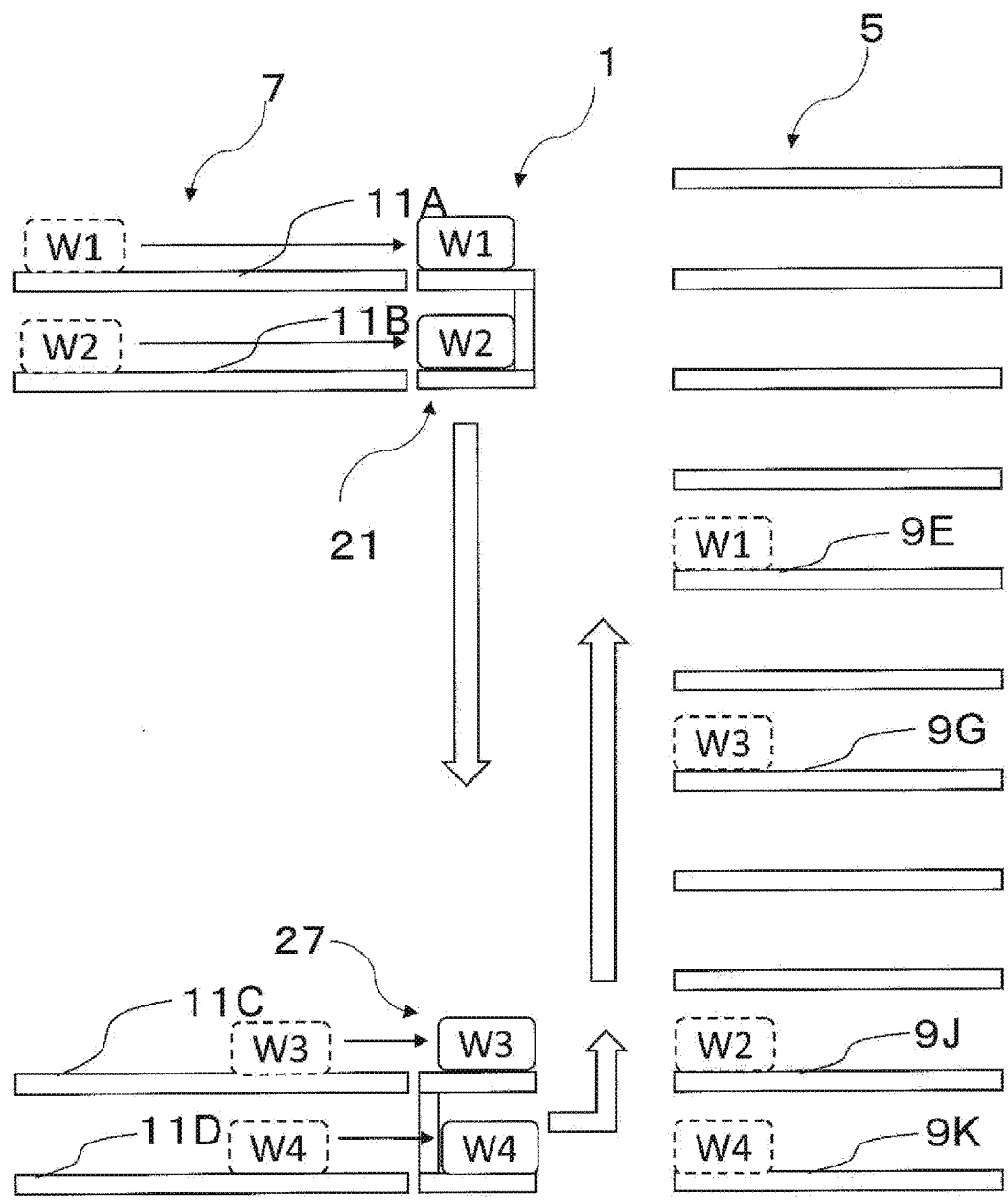
FIG. 12 is a schematic view illustrating an operation of the lift carrier device.

With reference to FIG. 12, a circulating operation mode of the lift carrier device 1 will be described. FIG. 12 is a schematic view for describing operation of the lift carrier device.

In the circulating operation mode, the first article stage and the second article stage 27 carry the articles W while circulating. In this preferred embodiment, the first article stage 21 and the second article stage 27 circulate counterclockwise in FIG. 12. That is, the first lift drive device 25 lifts or lowers the first longitudinal drive device 23, and the first longitudinal drive device 23 moves the first article stage 21 in the longitudinal direction at the upper ends and the lower ends of the first strut 41A, the first strut 41B, the second strut 42A, and the second strut 42B. Further, the second lift drive device 31 lifts or lowers the second longitudinal drive device 29, and the second longitudinal drive device 29 moves the second article stage 27 in the longitudinal direction at the upper ends and the lower ends of the struts. In the circulating operation mode, control to avoid collision between the first article stage 21 and the second article stage 27 is unnecessary, thus simplifying the control by the controller 83.

Note that positions where the first lift drive device 25 and the second lift drive device 31 change directions of vertical movement of the first longitudinal drive device 23 and the second longitudinal drive device 29 may be the uppermost ends or the lowermost ends of the first strut 41A, the first strut 41B, the second strut 42A, and the second strut 42B, or positions below the uppermost ends or positions above the lowermost ends. Further, positions where the first longitudinal drive device 23 and the second longitudinal drive device 29 respectively move the first article stage 21 and the second article stage 27 in the longitudinal direction may be positions where the first longitudinal drive device 23 and the second longitudinal drive device 29 are in the uppermost positions or the lowermost positions, or positions before the first longitudinal drive device 23 and the second longitudinal drive device 29 reach the uppermost positions or the lowermost positions.

In the preferred embodiment of FIG. 12, the first article stage 21 carries articles W1, W2 from the conveyors 11A, 11B to the conveyors 9E, 9J. Further, the second article stage 27 carries articles W3, W4 from the conveyors 11C, 11D to the conveyors 9G. 9K.

Specifically, the first article stage 21 moves downwards while being held in a position on the side corresponding to the conveyors 11A, 11B in the longitudinal direction. Further, the second article stage 27 moves to the side which is longitudinally separated from the conveyors 11C, 11D, and further moves upward. In this manner, the first article stage 21 and the second article stage 27 pass by each other. At this time, the first article stage 21 and the second article stage 27 are in longitudinally different positions, and thus do not collide with each other.

With reference to FIGS. 13 to 17, a random operation mode of the lift carrier device 1 will be described. FIGS. 13 to 17 are schematic views for describing operation of the lift carrier device. In the random operation mode, the first article stage 21 and the second article stage 27 move freely among the conveyors 11A to 11D and among the conveyors 9A to 9K. Hence, the first article stage 21 and the second article stage 27 are able to move along the shortest route, to thus improve the carrying efficiency.

However, since the first article stage 21 and the second article stage 27 cannot exist in the same position at the same time (including passing-by), the controller 83 performs collision prevention control. For example, when the first article stage 21 and the second article stage 27 respectively start movement at the shortest distances and collision therebetween in any position is predicted, the controller 83 changes the movement start time of one of or both of the article stages, or changes the traveling route for one of or both of the article stages.

Figure 13:
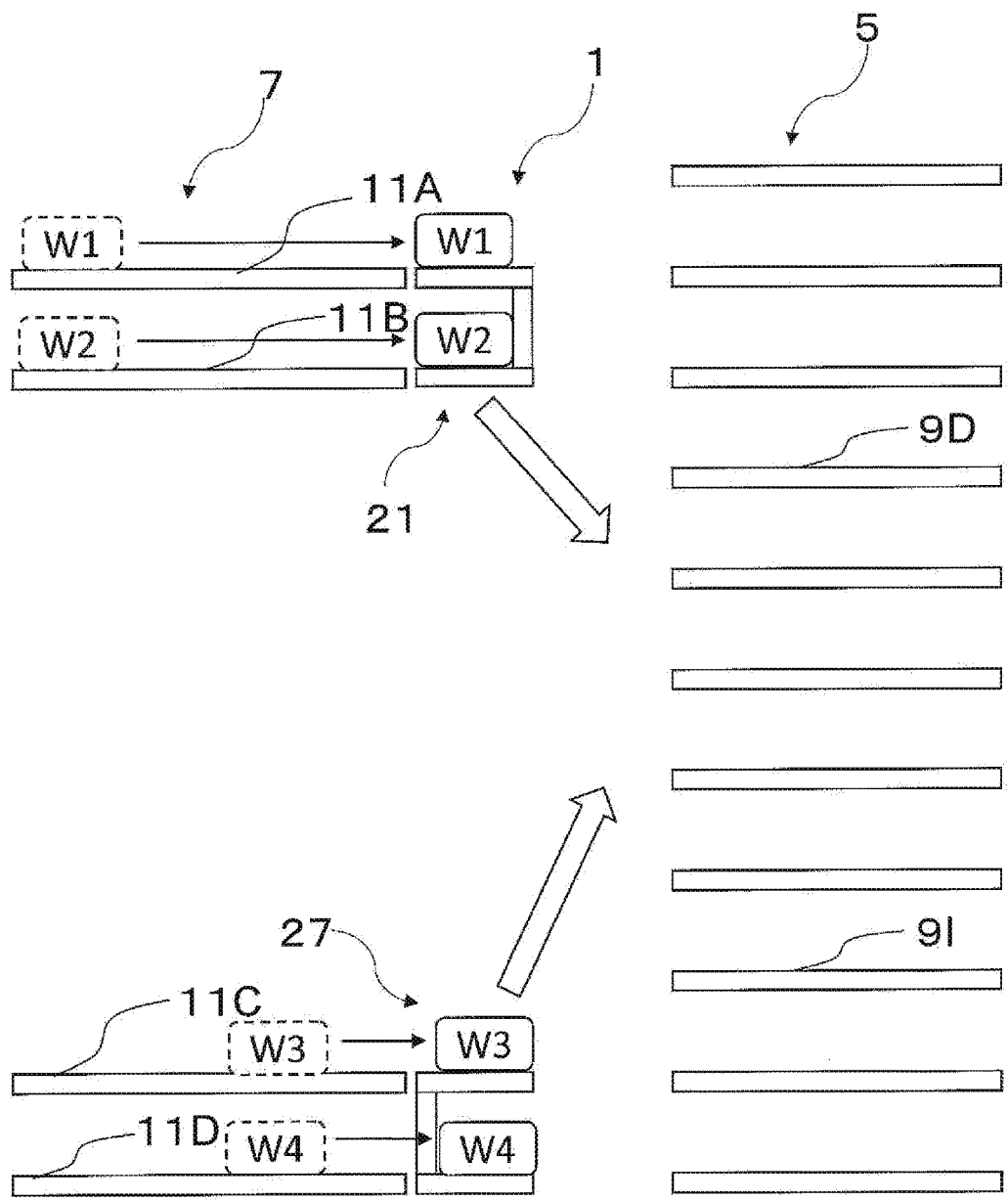
FIG. 13 is a schematic view illustrating an operation of the lift carrier device.

In the preferred embodiment of FIG. 13, the first article stage 21 carries the articles W1, W2 from the conveyors 11A, 11B to the conveyors 9D, 9H. Further, the second article stage 27 carries the articles W3, W4 from the conveyors 11C, 11D to the conveyors 9E, 91.

Figure 14:
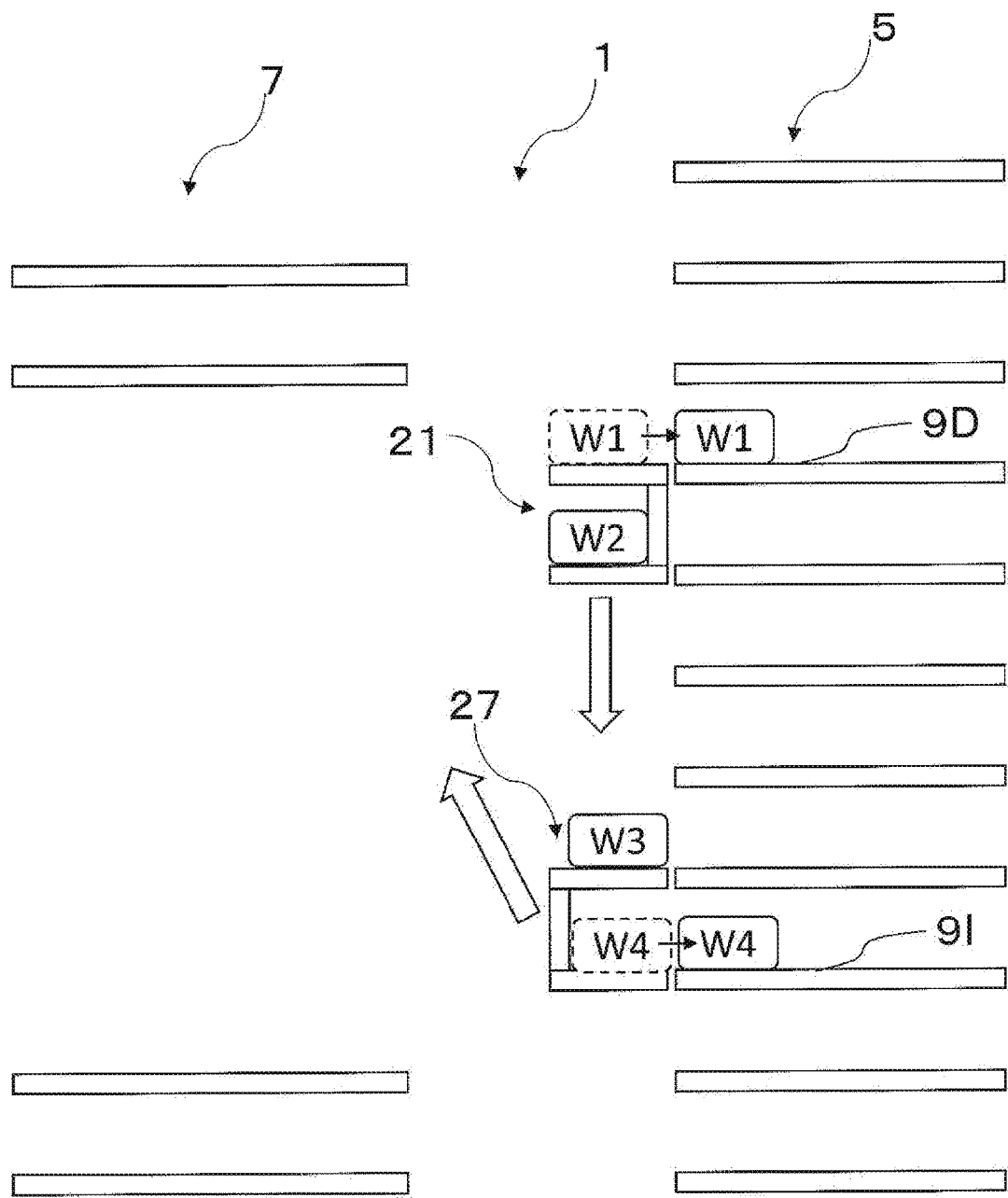
FIG. 14 is a schematic view illustrating an operation of the lift carrier device.

Specifically, as illustrated in FIGS. 13 and 14, by simultaneous driving of the first lift drive device 25 and the first longitudinal drive device 23, the first article stage 21 moves diagonally toward the conveyor 9E. Further, by simultaneous driving of the second lift drive device 31 and the second longitudinal drive device 29, the second article stage 27 moves diagonally toward the conveyor 9E.

Figure 15:
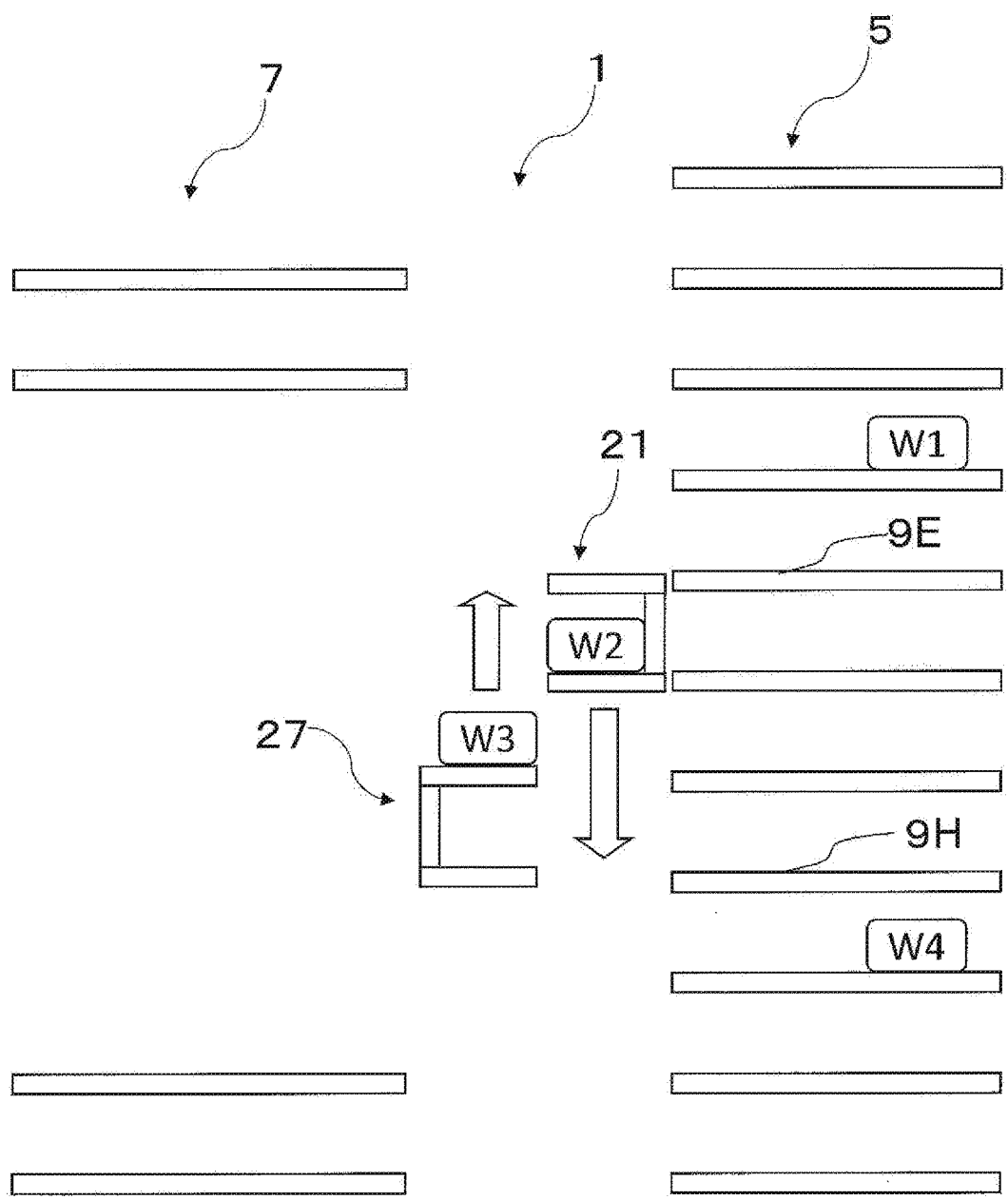
FIG. 15 is a schematic view illustrating an operation of the lift carrier device.

As illustrated in FIG. 14, the first article stage 21 transfers the article W1 to the conveyor 9D, and the second article stage 27 transfers the article W4 to the conveyor 9I. Subsequently, as illustrated in FIG. 14, the first article stage 21 moves downward from this state. Herein, although the shortest route for the second article stage 27 to the conveyor 9E that is the next destination is a route where the second article stage 27 moves upward from this state, when the second article stage 27 moves along this route, it will collide with the first article stage 21. Accordingly, as illustrated in FIGS. 14 and 15, the second article stage 27 moves diagonally upward to move to a position where the second article stage 27 does not longitudinally overlap with the first article stage 21 in plan view, to avoid collision with the first article stage 21. Subsequently, as illustrated in FIG. 15, the second article stage 27 moves upward. In this manner, the first article stage 21 and the second article stage 27 pass by each other. At this time, the first article stage 21 and the second article stage 27 are in longitudinally different positions, and thus do not collide with each other.

Figure 16:
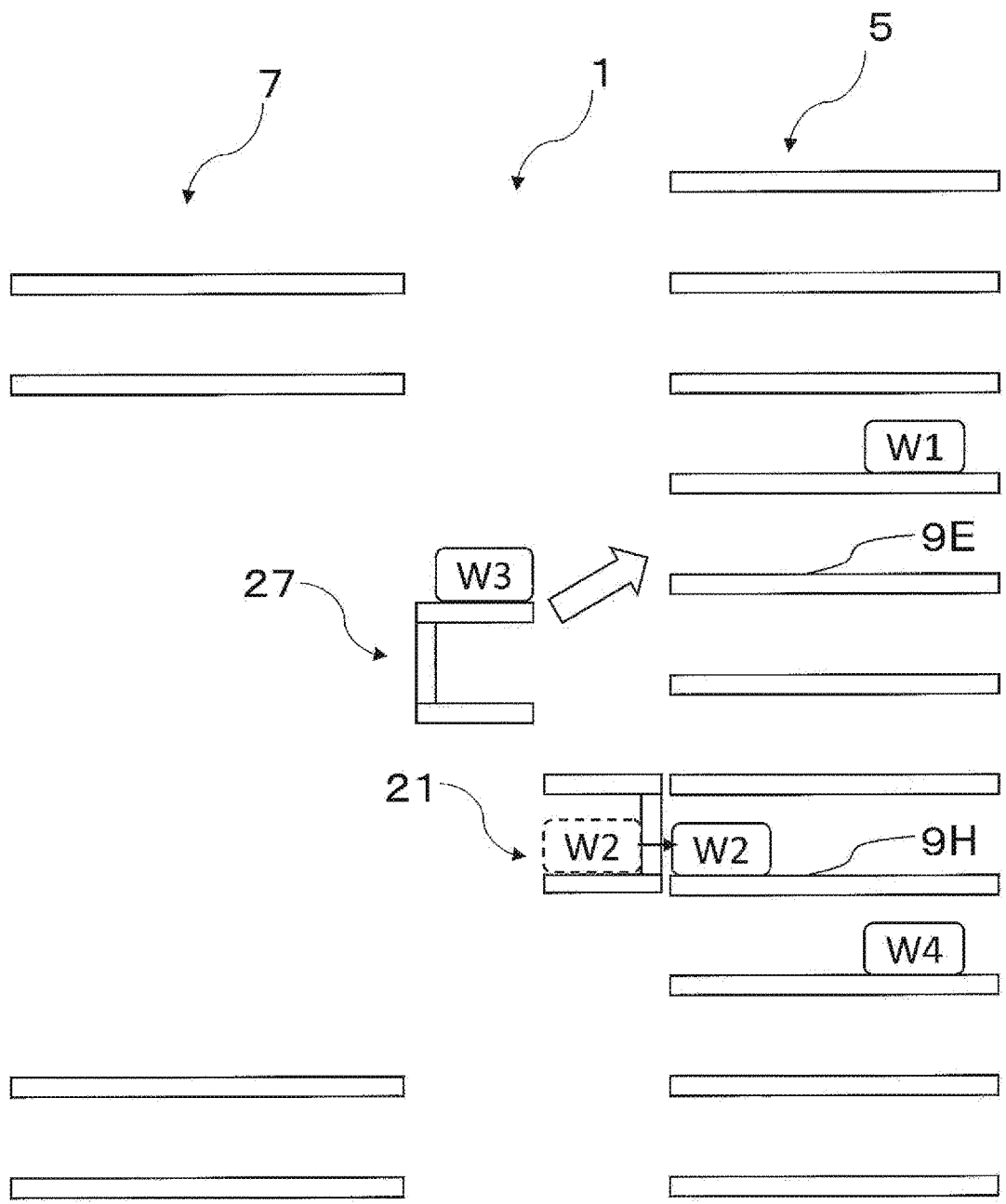
FIG. 16 is a schematic view illustrating an operation of the lift carrier device.
Figure 17:
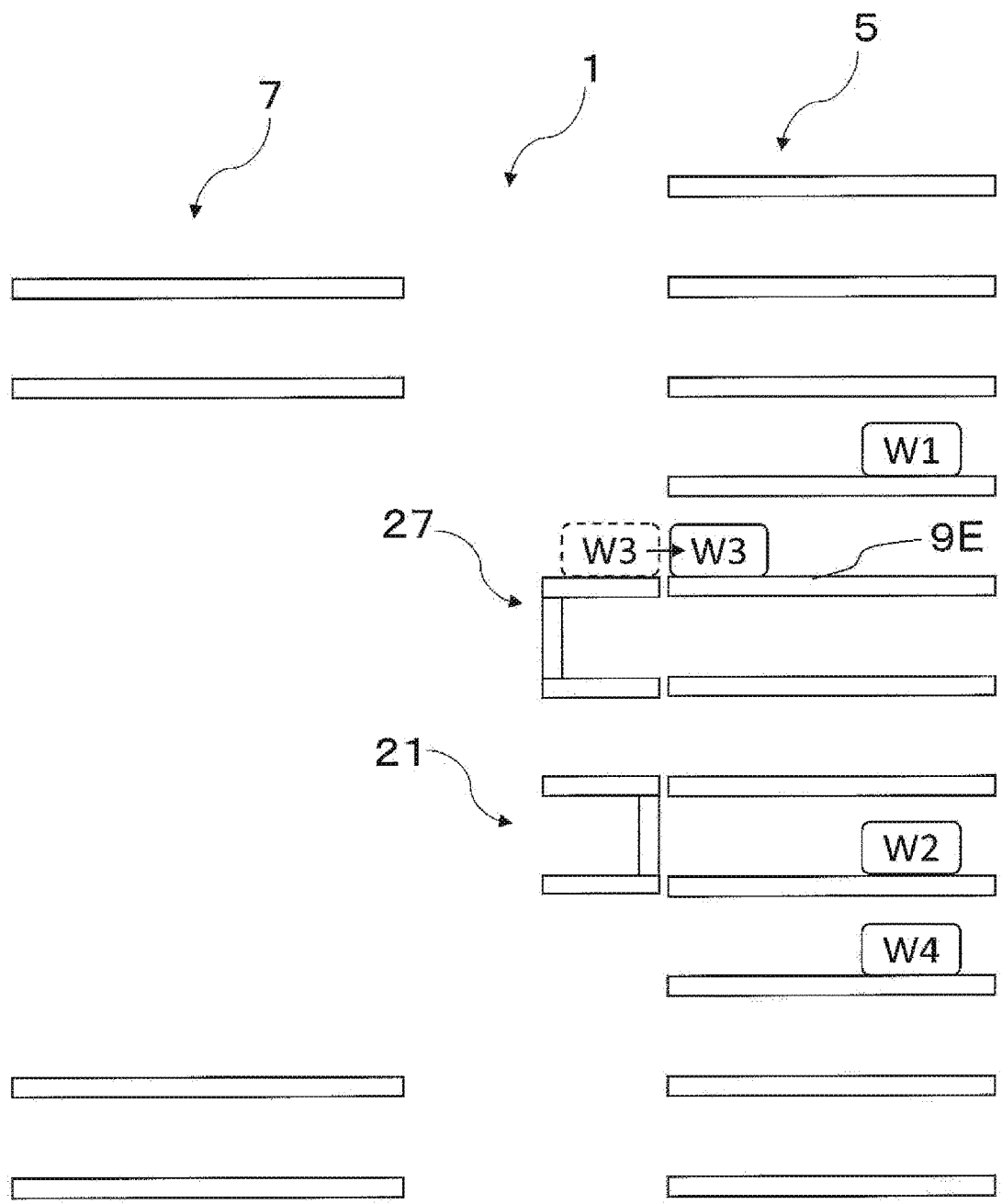
FIG. 17 is a schematic view illustrating an operation of the lift carrier device.

Next, as illustrated in FIG. 16, the first article stage 21 transfers the article W2 to the conveyor 9H. The second article stage 27 moves diagonally upward toward the conveyor 9E. Finally, the second article stage 27 transfers the article W3 to the conveyor 9E.

The lift carrier device 1 (one example of the lift carrier device) is a device that lifts or lowers and carries the article W. The lift carrier device 1 includes the first article stage 21 (one example of the first article stage), the first longitudinal drive device 23 (one example of the first longitudinal drive device), the first lift drive device 25 (one example of the first lift drive device), the second article stage 27 (one example of the second article stage), the second longitudinal drive device 29 (one example of the second longitudinal drive device), the second lift drive device 31 (one example of the second lift drive device), and the controller 83 (one example of the controller).

The first article stage 21 includes the first conveyor 33 (one example of the first conveyor) capable of moving the article W in the longitudinal direction.

The first longitudinal drive device 23 supports and drives the first article stage 21 in a longitudinally movable manner.

The first lift drive device 25 supports and drives the first longitudinal drive device 23 in a liftable manner.

The second article stage 27 includes the second conveyor 35 (one example of the second conveyor) capable of moving the article W in the longitudinal direction.

The second longitudinal drive device 29 is provided in a position to sandwich the first article stage 21 with the first longitudinal drive device 23 in the lateral direction perpendicular or substantially perpendicular to the longitudinal direction, and supports and drives the second article stage 27 in a longitudinally movable manner on the first longitudinal drive device 23 side.

The second lift drive device 31 supports and drives the second longitudinal drive device 29 in a liftable manner.

The controller 83 causes the first longitudinal drive device 23 and the second longitudinal drive device 29 to be lifted or lowered by the first lift drive device 25 and the second lift drive device 31, to cause the first article stage 21 and the second article stage 27 to pass by each other in a state where the first article stage 21 and the second article stage 27 have been moved by the first longitudinal drive device 23 and the second longitudinal drive device 29 to positions where the first article stage 21 and the second article stage 27 do not longitudinally overlap each other in plan view.

In the lift carrier device 1, the first lift drive device 25 lifts or lowers the first longitudinal drive device 23, the first longitudinal drive device 23 longitudinally moves the first article stage 21, and the first conveyor 33 of the first article stage 21 longitudinally moves the article W. Further, the second lift drive device 31 lifts or lowers the second longitudinal drive device 29, the second longitudinal drive device 29 longitudinally moves the second article stage 27, and the second conveyor 35 of the second article stage 27 longitudinally moves the article W. With the above operation, the lift carrier device 1 carries the article W.

In the lift carrier device 1, since the two article stages carry the articles W, the carrying capacity of the lift carrier device 1 is improved. In particular, since the first article stage 21 and the second article stage 27 are able to pass by each other by being lifted or lowered in a state where the first article stage 21 and the second article stage 27 have been moved to positions where they do not longitudinally overlap each other in plan view, the flexibility to carry the article is increased. This leads to an improvement in capacity of the lift carrier device 1 to carry the article W.

Other Preferred Embodiments

While one preferred embodiment of the present invention has been described above, the present invention is not limited to the above preferred embodiment, and a variety of changes can be made in a range not deviating from the gist of the present invention. In particular, a plurality of preferred embodiments and alternative preferred embodiments described in the present specification can be combined arbitrarily as needed.

In the above preferred embodiment, the longitudinal lengths of the first article stage 21 and the second article stage 27 are preferably about half of the longitudinal lengths of the first body 51 and the second body 71, and the first article stage 21 and the second article stage 27 preferably are able to be arranged in the first position and the second position on both longitudinal sides. However, since the first article stage 21 and the second article stage 27 only have to be able to pass by each other in the vertical direction, they are not limited to the above configuration. For example, the longitudinal lengths of the first article stage and the second article stage may be shorter than those in the above preferred embodiment. In that case, the first article stage and the second article stage can be arranged in a plurality of positions other than the first position and the second position on both longitudinal sides.

In the above preferred embodiment, each of the lift stages preferably includes two conveyors, that is, a plurality of conveyors, but the number of conveyors of the lift stage is not limited thereto. For example, the number of conveyors of the lift stage may be one, or may be three or more.

In the above preferred embodiment, the lift carrier device is preferably used both to carry the article into and out of the automated warehouse, but it may be used only to carry the article into or carrying the article out of the automated warehouse.

The endless drive transmission member may be a belt.

Preferred embodiments of the present invention are widely applicable to a lift carrier device to carry an article into or out of an automated warehouse that includes a plurality of levels of shelves.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A lift carrier device that lifts or lowers and carries an article, the lift carrier device comprising:
- a first article stage which includes a first conveyor that moves the article placed thereon in a longitudinal direction;
- a first longitudinal drive device which supports and drives the first article stage in a longitudinally movable manner;
- a first lift drive device which supports and drives the first longitudinal drive device in a liftable manner;
- a second article stage which includes a second conveyor that moves the article placed thereon in the longitudinal direction;
- a second longitudinal drive device positioned such that the first article stage is located between the second longitudinal drive device and the first longitudinal drive device in a lateral direction perpendicular to the longitudinal direction, the second longitudinal drive device supports and drives the second article stage in a longitudinally movable manner;
- a second lift drive device which supports and drives the second longitudinal drive device in a liftable manner; and
- a controller configured or programmed to cause the first longitudinal drive device and the second longitudinal drive device to be relatively lifted or lowered by the first lift drive device and the second lift drive device, to cause the first article stage and the second article stage to pass by each other in a vertical direction in a state where the first article stage and the second article stage have been moved by the first longitudinal drive device and the second longitudinal drive device to positions where the first article stage and the second article stage do not longitudinally overlap each other in a plan view; wherein
- the first longitudinal drive device includes a first body including a pair of first frames, each of which is arranged separately in the vertical direction and extends in the longitudinal direction, and a pair of second frames, each of which is arranged on each longitudinal side and extends in the vertical direction to couple end portions of the pair of first frames; and
- the second longitudinal drive device includes a second body including a pair of third frames, each of which is arranged separately in the vertical direction and extends in the longitudinal direction, and a pair of fourth frames, each of which is arranged on each longitudinal side and extends in the vertical direction to couple end portions of the pair of third frames.

2. The lift carrier device according to claim 1, further comprising:
- a pair of first struts, each of which is arranged separately in the longitudinal direction and liftably supports the first body;
- a pair of second struts, each of which is arranged separately in the longitudinal direction and liftably supports the second body; and
- a plurality of coupling members which extend in the lateral direction and couple the first strut and the second strut that correspond to each other in the longitudinal direction; wherein
- the plurality of coupling members are provided in positions where the coupling members do not inhibit storage and retrieval of the article in the longitudinal direction on the first article stage and the second article stage.

3. The lift carrier device according to claim 1, wherein
- the first longitudinal drive device includes a first drive mechanism that moves the first article stage in the longitudinal direction;
- the first drive mechanism is within a lateral width of the first body in the plan view;
- the second longitudinal drive device includes a second drive mechanism that moves the second article stage in the longitudinal direction; and
- the second drive mechanism is within a lateral width of the second body in the plan view.

4. A lift carrier device that lifts or lowers and carries an article, the lift carrier device comprising:
- a first article stage which includes a first conveyor that moves the article placed thereon in a longitudinal direction;
- a first longitudinal drive device which supports and drives the first article stage in a longitudinally movable manner;
- a first lift drive device which supports and drives the first longitudinal drive device in a liftable manner;
- a second article stage which includes a second conveyor that moves the article placed thereon in the longitudinal direction;
- a second longitudinal drive device positioned such that the first article stage is located between the second longitudinal drive device and the first longitudinal drive device in a lateral direction perpendicular to the longitudinal direction, the second longitudinal drive device supports and drives the second article stage in a longitudinally movable manner;
- a second lift drive device which supports and drives the second longitudinal drive device in a liftable manner; and
- a controller configured or programmed to cause the first longitudinal drive device and the second longitudinal drive device to be relatively lifted or lowered by the first lift drive device and the second lift drive device, to cause the first article stage and the second article stage to pass by each other in a vertical direction in a state where the first article stage and the second article stage have been moved by the first longitudinal drive device and the second longitudinal drive device to positions where the first article stage and the second article stage do not longitudinally overlap each other in a plan view; wherein
- the first lift drive device includes a plurality of first direction conversion members, a first endless drive transmission member that is hung on the plurality of first direction conversion members and mounted with the first longitudinal drive device, and a first counter weight mounted on the first endless drive transmission member;
- the second lift drive device includes a plurality of second direction conversion members, a second endless drive transmission member that are hung on the plurality of second direction conversion members and mounted with the second longitudinal drive device, and a second counter weight mounted on the second endless drive transmission member; and
- the first counter weight and the second counter weight are located on the same lateral side with respect to the first article stage and the second article stage.

* * * * *